US006807481B1

(12) United States Patent
Gastelum

(10) Patent No.: US 6,807,481 B1
(45) Date of Patent: Oct. 19, 2004

(54) COMPUTERIZED LOG AND COMPLIANCE SYSTEM FOR TRUCK DRIVERS

(76) Inventor: Ralph F Gastelum, 23704 Prospect Valley Dr., Diamond Bar, CA (US) 12682

( * ) Notice: Subject to any disclaimer, the term of this patent is extended or adjusted under 35 U.S.C. 154(b) by 0 days.

(21) Appl. No.: 10/269,959

(22) Filed: Oct. 11, 2002

(51) Int. Cl.[7] ........................... G01C 21/34; G06F 19/00
(52) U.S. Cl. ........................... 701/209; 701/35; 340/438
(58) Field of Search ............................. 701/1, 35, 201, 701/209, 213; 342/357.13; 340/438, 439, 995.19, 995.24; 369/21

(56) References Cited

U.S. PATENT DOCUMENTS

| | | | |
|---|---|---|---|
| 4,926,331 A | * 5/1990 | Windle et al. | 701/35 |
| 5,612,875 A | 3/1997 | Haendel et al. | 364/424.04 |
| 5,633,622 A | 5/1997 | Patterson | 340/309.15 |
| 5,886,331 A | * 3/1999 | Lyons, Jr. | 235/61 B |
| 6,104,282 A | 8/2000 | Fragodo et al. | 340/309.15 |
| 6,181,995 B1 | 1/2001 | Luper et al. | 701/35 |
| 6,317,668 B1 | * 11/2001 | Thibault | 701/35 |
| 6,351,695 B1 | * 2/2002 | Weiss | 701/35 |
| 6,526,341 B1 | * 2/2003 | Bird et al. | 701/35 |
| 2001/0020204 A1 | * 9/2001 | Runyon et al. | 701/35 |
| 2002/0035421 A1 | * 3/2002 | Warkentin | 701/29 |
| 2002/0059075 A1 | * 5/2002 | Schick et al. | 705/1 |
| 2002/0165694 A1 | * 11/2002 | Chene et al. | 702/182 |

OTHER PUBLICATIONS

Derwent Abstracts: Kolawole et al.; AU 695819 B; Aug. 20, 1998.*

* cited by examiner

Primary Examiner—Michael J. Zanelli
(74) Attorney, Agent, or Firm—Goldstein Law Offices PC

(57) ABSTRACT

A logging and compliance computer system for use by drivers in meeting regulation when driving a vehicle containing a cargo. The system identifies the driver and retrieves a data record for that driver containing the driver's history of recent driving. The system accepts a destination, equipment safety report, and cargo description from the driver. The system plots a route to the destination considering the equipment safety report, the cargo description, the driver history, and regulations governing the driver operating the vehicle and transporting the cargo. The driver is allowed to drive if permissible under the regulations considering the driver's history while the system times the driving and regularly updates the data record. When the driver is no longer permitted to drive, the system warns the driver to rest. Following a rest period, when driving is again permissible under the regulations, the driver is alerted to continue to the destination.

4 Claims, 2 Drawing Sheets

COMPUTERIZED LOG AND COMPLIANCE SYSTEM FOR TRUCK DRIVERS

BACKGROUND OF THE INVENTION

The invention relates to a computerized log for truckers. More particularly, the invention is a system that requires certain information from a truck driver prior to initiating a trip, provides information to the truck driver before, during, and after the trip, and keeps track of the driver's compliance with various regulations and laws.

Overland transport is still the predominant method of distributing goods throughout the United States and in most regions of the world. The demand for such distribution in turn places significant demands upon truck drivers. Often they are required to seemingly drive continuously in order to transport cargo "on-time".

In recent decades significant attention has been called to the issue of safety among truck drivers. In particular, the fact that many drivers were in fact driving continuously, and were thus at a lowered sense of alertness, has considered to be the cause of highway accidents and fatalities. These perceptions lead to legislation and regulations that seek to determine how much and how often a truck driver can drive, and dictate the amount and frequency of rest periods. Further legislation and regulations have been promulgated regarding equipment safety and inspections.

When hazardous materials and weapons are transported by truck, additional regulations must be followed. It is not always easy to determine whether such regulations pertain to certain cargo, and how they modify the standard rules the truck driver is accustomed to following.

Many of these regulations can be daunting to the truck driver who seeks to carry out his or her profession. In addition, the paperwork and record keeping that is required can be time consuming.

U.S. Pat. No. 6,104,282 to Fragoso et al. discloses a daily log device, which allows the user to time periods when the driver is on duty and driving, on duty but not driving, and off duty. Fragoso also generates a printed log of the measured time periods. However, Fragoso does not provide the driver with guidance as to whether regulations are being met and in no way helps ensure compliance with equipment safety regulations.

U.S. Pat. No. 5,644,622 to Patterson discloses a truck driver logging device that allows the truck driver to log his/her activity, and provide a graphical display of the same in a standard format. However, Patterson similarly provides little or no guidance to the driver, and does nothing to ensure compliance with equipment safety regulations.

U.S. Pat. Nos. 6,181,995 to Luper et al and 5,612,875 to Haendel et al. both disclose systems for determining the mileage of a truck driver while within a particular state. However, neither Haendel nor Luper disclose an interactive system that aids the trucker in complying with safety regulations.

While these units may be suitable for the particular purpose employed, or for general use, they would not be as suitable for the purposes-of the present invention as disclosed hereafter.

SUMMARY OF THE INVENTION

It is an object of the invention to provide a computerized log system for truckers that helps a truck driver comply with safety regulations. Accordingly, the truck driver's activities are monitored to determine the extent that the driver is permitted to drive, and determine the frequency and duration of rest periods.

It is another object of the invention to compel the driver to monitor and maintain equipment safety. Accordingly, the driver is required to enter any equipment discrepancies and repair history. Such information may be reviewed by officials during inspections to ensure that the driver has complied with such duty and has reported any discrepancies.

It is yet another object of the invention to provide the driver with a recommended route, including projected rest locations. Accordingly, in conjunction with stored maps, the on-board GPS, the driver's activities, and the requisite regulations, the system will plot a route and indicate when and where the driver will need to rest.

It is a still further object of the invention to help the driver comply with all appropriate regulations. Accordingly, the system inquires about the nature of the cargo and ensures compliance with any appropriate rules. The system also gives the truck driver access to all regulations and laws that may be applicable, such as D.O.T. and N.A.F.T.A regulations.

It is yet a further object of the invention to help the driver comply with record keeping requirements in order to avoid time consuming paperwork. Accordingly, the system automatically maintains records of the driver's activities.

It is yet another object of the invention to allow use by multiple drivers. Accordingly, the system maintains records associated with each driver who uses the system. Accordingly, when a first driver is required to rest, a second driver can continue the trip using the same equipment and the same system.

To the accomplishment of the above and related objects the invention may be embodied in the form illustrated in the accompanying drawings. Attention is- called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
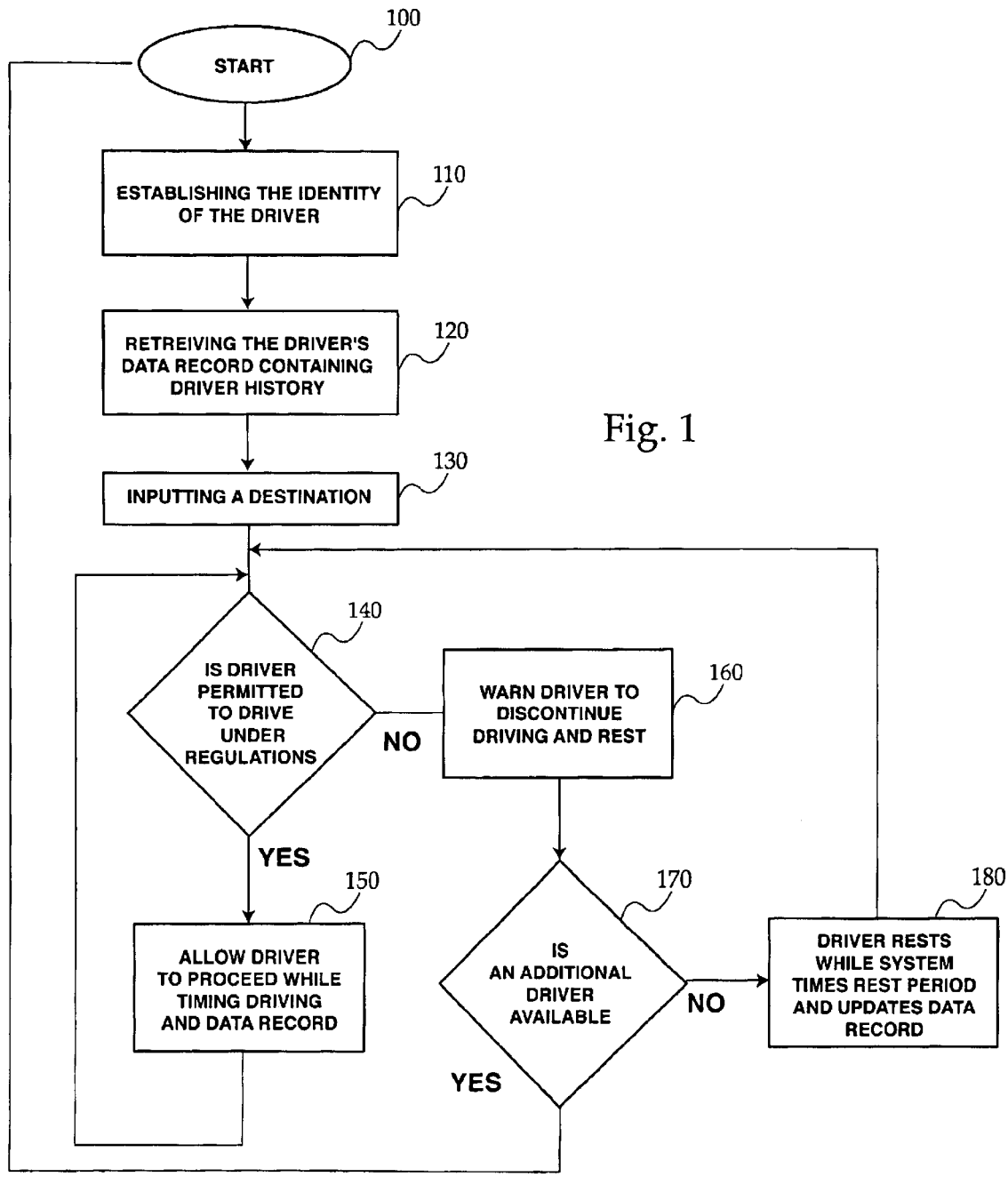
FIG. 1 is a flow chart, illustrating major tasks carried out by the system of the present invention.

Described herein is a computerized log system for truck drivers, which may be implemented using a portable, standalone, portable computer system that may be transported from truck to truck, or a computer system actually integrated within the truck. In this regard, such a computer system employs standard components, such as volatile memory, non-volatile storage, a user interface including display and user input devices, a clock with battery backup, communication devices such as wireless data communication transceiver(s) and a GPS receiver, a card reader or scanner, a data port for providing a wired connection to other computers, and a printer. All such components operate under the control of a central processing unit that facilitates communication between all such components to carry out the functionality as described hereinafter. The specific systems integration required to accomplish the goals of the present invention would be readily apparent to those skilled in the art, following the functionality described in the present description.

Further, the term "user", as employed herein, generally refers interchangeably with "truck driver". "Regulation" pertains to any regulations and laws that the truck driver is bound to follow. Further "truck" as defined herein, need not refer specifically to a "truck" in the traditional sense, it can refer to any overland vehicle that is professionally driven.

Initially, the driver 'logs in' to the system. At that time, the system requires that the user identify himself/herself and authenticate such identification. Accordingly, a card reader or scanner may be provided to allow the driver's license of the user to be scanned as a first step, in order to initiate operation of the log system. The user might also be asked for further information to authenticate his/her identity, such as a social security number or a password. A data record is associated with each user containing the user's driving history and biographical information. Accordingly, once the user is identified and authenticated, the user's data record is retrieved. However, if the user has not previously accessed the system, a new data record is created for the new user, and preliminary questions may be asked by the system to establish biographical information. The driver's history includes a "duty cycle" of the driver's recent driving activity, including hours and mileage driven recently as well as rest periods therebetween. The biographical information includes medical restrictions for the driver, which may be entered by the user, or automatically read from the driver's license or medical card, or obtained by accessing a centralized database using a wired or wireless data communication transceiver.

The user is prompted to provide an equipment safety report, which details maintenance concerns. In particular, the user is prompted to report any discrepancies in the condition of the truck, and the repair history of the truck. Accordingly, the user is required to document any equipment discrepancies whatsoever, and to disclose any further information the driver wishes to document concerning the safety of the truck. Accordingly to a preferred embodiment of the invention, the proper reporting of discrepancies will absolve the driver from responsibility if subsequently discovered at an inspection checkpoint. Such absolution could be limited to those discrepancies that do not render the vehicle unsafe to drive.

The user is also prompted to describe the cargo by entering a cargo description. The cargo may be described in terms of weight, perishable status, value, safety rating, and any other factors which might otherwise determined the rules the driver must follow, the roads the driver is permitted to travel upon, places where the vehicle can be parked overnight or otherwise, and time constraints directly related to the transport of such cargo. For example, certain roads will not allow cargo having a certain cargo description because a weight limit is exceeded or hazardous materials are not permitted on that road.

The user is then prompted to enter at least one destination. In particular, the user may be prompted to enter a street address, coordinates, or other information from which the system can ascertain the intended destination. Once the destination has been established, the system ascertains the present location of the vehicle, generally using GPS technology. GPS technology employs a vehicle mounted receiver which accepts signals from multiple satellites having known locations. The location of the vehicle is determined mathematically once several such signals are received.

The system calculates the distance to the destination, and plots a course to that destination. When plotting the course, in addition to considering standard factors that are used by navigation systems to determine a preferred route, the system takes into account regulations that govern which driver, the cargo description, and use and parking of the vehicle. Accordingly, the plotted course standardly includes the roads to be traveled upon, turns, and exits. However, according to the present invention, the plotted course also includes rest stops and equipment checks to meet the regulations regarding the driver, considering the projected time to reach those rest stops, and constraints dictated by the cargo description. In addition, anticipated fuel stops and lunch breaks are projected and incorporated into the plotted course.

Once the driver begins the journey, the system charts, times and logs the movements of the driver and vehicle. The system continuously updates the course as required by the driver and cargo constraints. For example, if the driver was delayed by traffic, and a break time is approaching, the system will locate and determine an alternate rest stop— even if the stop is somewhat off-course. Further, if the driver violates a rule by exceeding the allowable driving distance or hours, a warning will sound, and will be recorded. However, the driver is also given the opportunity to note the circumstances at the time into the system, and accordingly to record acceptable excuses such as break-downs, extreme weather, and the like to memorialize that the violation was beyond the control of the driver.

When a mandatory rest period is reached, a new (additional) driver can log into the system, and the data record for that driver is retrieved. If the driver is qualified, certain information is requested from the driver, including the driver's report of the vehicle condition and cargo. Travel can then continue to the destination, and the distance traveled and driving time of the new driver are logged by the-system and stored in the data record for that driver. In addition, the data record of the previous (first) driver is simultaneously updated to credit the driver for resting. The system can notify the first driver when he/she is once again eligible to drive. Accordingly, "team drivers" are seamlessly accommodated by the system.

When a rest period is reached, and driver ceases driving, the system can be set to automatically generate an alarm at the end of the mandated rest period. Thus, if the rest period is one hour, then the alarm will sound one hour after the driving is stopped. Similarly, if the driver attempts to begin driving before the end of a mandatory rest period, an alarm will sound, and the violation is logged in the driver's data record.

In furtherance of the foregoing general mode of operation, the data input from each driver and logged by the system are stored in the data record for the driver. Such data may be accessed by the driver, and by authorized personal. In particular, the data port may be used to access the system by trucking companies at the destinations, at truck scales, and by other officials at highway safety stops. Accordingly, the authorized personnel can easily assess whether the vehicle and the drivers are in compliance with all rules.

To further aid compliance with the rules, the system can provide a fully searchable database of all applicable rules governing the driver, such as Department of Transportation, state, and even union rules and regulation. The database can be maintained internally by the system, or accessed remotely by the system.

Figure 2:
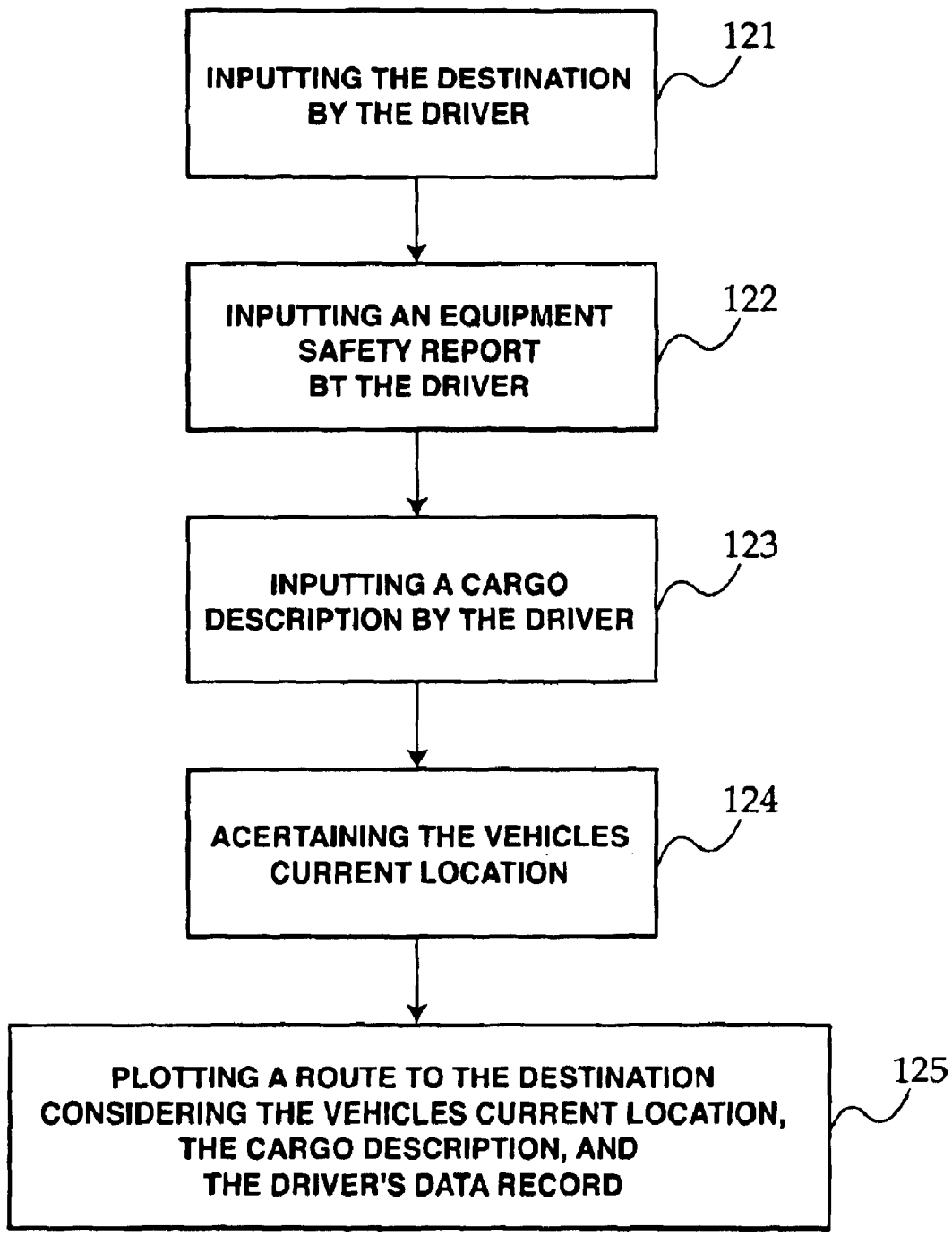
FIG. 2 is a flow chart, illustrating additional tasks carried out according to an embodiment of the present invention.

A pictorial overview of the major tasks carried out by the system is illustrated in FIG. 1 and FIG. 2, as described narratively herein. In particular, immediately after a start 100, the system establishes the identity of the driver 110, and retrieves the data record containing the driver history 120. The driver is prompted to input a destination 130. Based upon the driver history, the system determines whether the driver is permitted to drive under the regulations 140. If the driver is permitted, the driver is allowed to proceed while the system continually (repeatedly) times and measures the driving and updates the data record for the driver 150. Steps 140 and 150 may be repeated until the destination is reached, or until determination 140 indicates that the driver is not permitted to drive under the regulations. If (and when) determination 140 indicates that the driver is not permitted to drive under the regulations, the system warns the driver to discontinue driving and begin a rest period 160. Further, if another determination 170 indicates that an additional driver is available, that driver's identity is established and confirmed by the system 110. However if the determination 170 indicates that another driver is not available, then the driver rests while the system times the rest period and repeatedly updates the data record 180. When it is determined at 140 that it is once again permissible for the driver to operate the vehicle, the driver is allowed to continue toward the destination 150.

The tasks delineated in FIG. 1 are somewhat expanded upon in FIG. 2. In particular the task of inputting a destination 130 from FIG. 1 may be considered to include the additional steps indicated by FIG. 2. Accordingly, the driver inputs the destination 121, and then is prompted to input a safety report 122 and a cargo description 123. Then the system ascertains the current location of the vehicle 124. From the information obtained in 121, 122, 123, and 124, the system plots a route to the destination, which considers the vehicle's current location, the cargo description, and the driver history contained in the driver's data record 125.

In conclusion, herein is presented a system for logging the driving, inspection, cargo, and rest activities of a driver, and aiding the driver in complying with regulations regarding the same by notifying the driver when in compliance, when not in compliance, and by offering suggestions which aid the driver to stay in compliance. This system may be embodied in the form described herein. However, it should be noted that the foregoing description and the accompanying drawings are illustrative only. Numerous variations are possible, while adhering to the inventive concept. Such variations are contemplated as being a part of the present invention.

What is claimed is:

1. A logging and compliance assistance method, for use by a driver while driving a vehicle, the driver having a driving history which indicates a duty cycle of recent driving and rest periods for the driver, in complying with driving regulations which dictate the allowable duty cycle for the driver, using a computer system which is transportable within the vehicle, comprising the steps of:

establishing the identity of the driver by the computer system;

retrieving a data record associated with the driver by the computer system, the data record including the driver history for the driver;

accepting a destination from the driver by the computer system;

plotting a route by the computer system while taking into account the driver history, projecting locations where the driver will be required to rest by the regulations, and plotting rest areas near said projected locations;

repeatedly determining whether operation of the vehicle by the driver is permissible by the computer system by comparing the driver history to the driving regulation:

accepting an equipment safety report concerning the vehicle condition from the driver and updating the data record associated with the driver, allowing the driver to proceed to the destination when operation of the vehicle by the driver is permissible, while measuring and driving distance and driving time and updating the driver history, and warning the driver to discontinue operation of the vehicle when operation of the vehicle is not permissible.

2. The logging and compliance assistance method as recited in claim 1, wherein the step of warning the driver to discontinue operation of the vehicle when operation of the vehicle is not permissible is followed by the step of:

waiting while the driver rests; and alerting the driver when driving is again permissible under the regulations.

3. The logging and compliance assistance method as recited in claim 2, wherein the driver previously recited is referred to as a first driver, and wherein said first driver is accompanied by an additional driver, wherein the step of waiting while the driver rests further comprises the steps of:

identifying the additional driver by the computer system;

retrieving the data record including the driver history for the additional driver; and repeatedly determining by the computer system whether operation of the vehicle by the additional driver is permissible by comparing the driver history of the additional driver to the driving regulations, and:

allowing the additional driver to proceed to the destination when operation of the vehicle by the additional driver is permissible, while measuring driving distance and driving time and updating the driver history for the additional driver, while crediting the driver history for the first driver with rest time, and warning the additional driver to discontinue operation of the vehicle when operation of the vehicle is not permissible.

4. The logging and compliance assistance method as recited in claim 3, wherein the step of allowing one of the first driver and the additional driver to proceed to the destination is preceded by the step of allowing one of the first driver and the additional driver to enter the cargo description, and wherein the step of plotting a route by the computer system further includes considering the cargo description and road restrictions which partain the the cargo description.

* * * * *